E. W. RIDER.
MOLDING MACHINE.
APPLICATION FILED JAN. 7, 1911.

1,051,010.

Patented Jan. 21, 1913.

INVENTOR
Ebenezer W. Rider,

WITNESSES

E. W. RIDER.
MOLDING MACHINE.
APPLICATION FILED JAN. 7, 1911.

1,051,010.

Patented Jan. 21, 1913.

INVENTOR
Ebenezer W. Rider.

WITNESSES
J. Stuart Freeman
A. Irwin Gardner

BY
Horace Pettit
ATTORNEY

UNITED STATES PATENT OFFICE.

EBENEZER W. RIDER, OF DETROIT, MICHIGAN.

MOLDING-MACHINE.

1,051,010.  Specification of Letters Patent.  Patented Jan. 21, 1913.

Application filed January 7, 1911. Serial No. 601,270.

*To all whom it may concern:*

Be it known that I, EBENEZER W. RIDER, a citizen of the United States, residing at Detroit, county of Wayne, State of Michigan, have invented certain new and useful Improvements in Molding-Machines, of which the following is a specification.

The main objects of this invention are, to provide an improved molding machine of simple, compact and durable construction for molding bricks, blocks, tiles, briquets, or other molded product, of various kinds of material, and more particularly of cement; to provide a molding machine in which all of the movements are automatic, and which will operate rapidly to produce compact bricks or other molded products of substantilly uniform density, free from voids, and having smooth surfaces, and substantially uniform dimensions; to provide a molding machine in which the final shaping of the product of the machine will occur on pallets upon which the product may be removed from the machine; to provide a molding machine which will compress and shape its product by a tamping process, and particularly by percussion produced by gravity rather than by a steady pressure, as in hydraulic and other brick machines heretofore used; to provide a molding machine in which a brick, or other article, is molded by strokes or blows acting upon opposite sides of the article wherein the article is given a substantially exact predetermined form, and a substantially uniform density; to provide a molding machine in which an article is first compressed into an approximate form and is then given a finishing compression; to provide a molding machine having a vertical movable mold and in which the mold is free to move in either direction vertically when the material is being compressed therein; and to provide other improvements as will appear hereinafter.

In the accompanying drawings.

Figure 1:
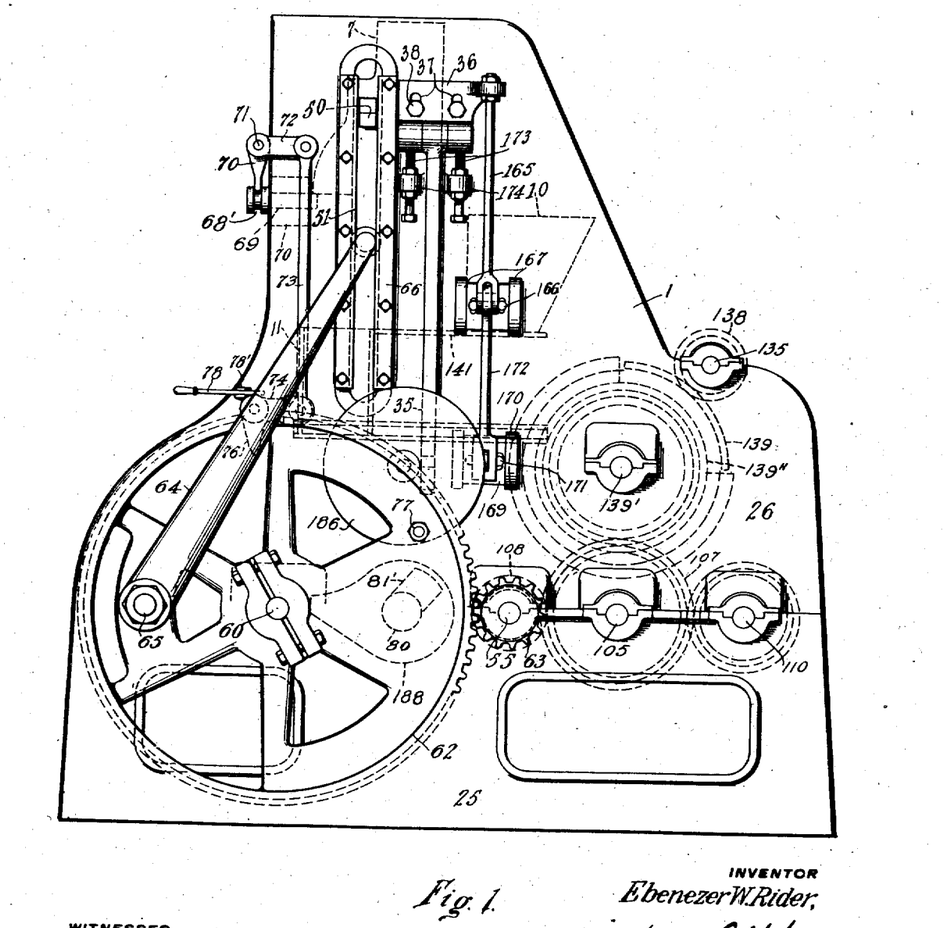
Figure 1 is a side elevation of a brick machine constructed in accordance with this invention.
Figure 2:
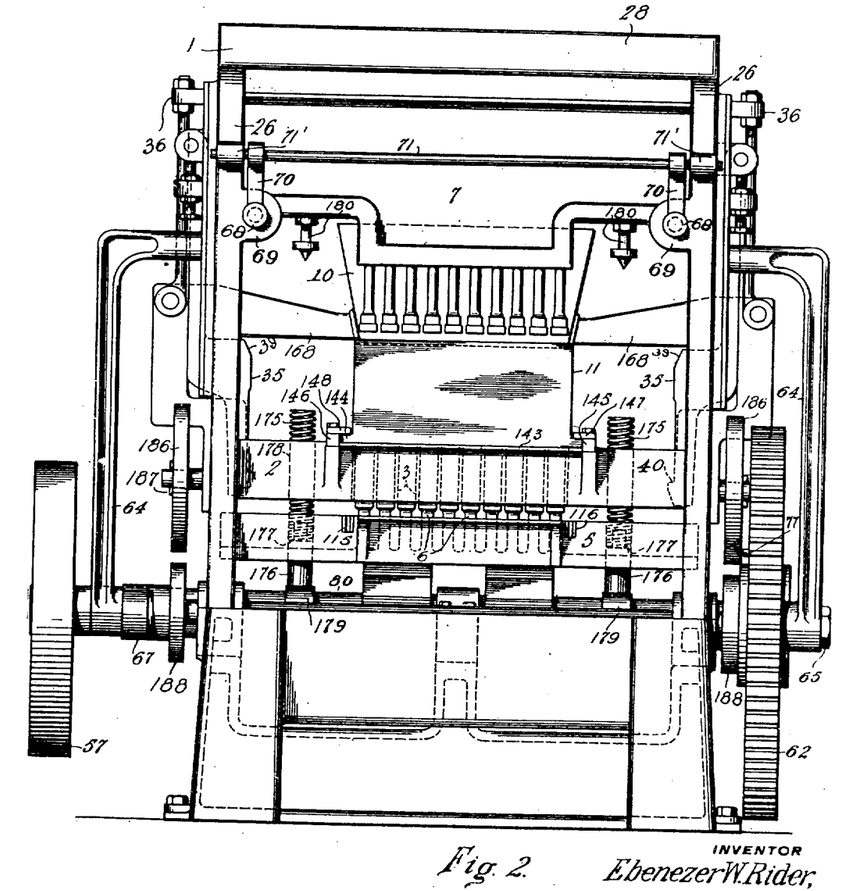
Fig. 2 a front elevation of the same.
Figure 3:
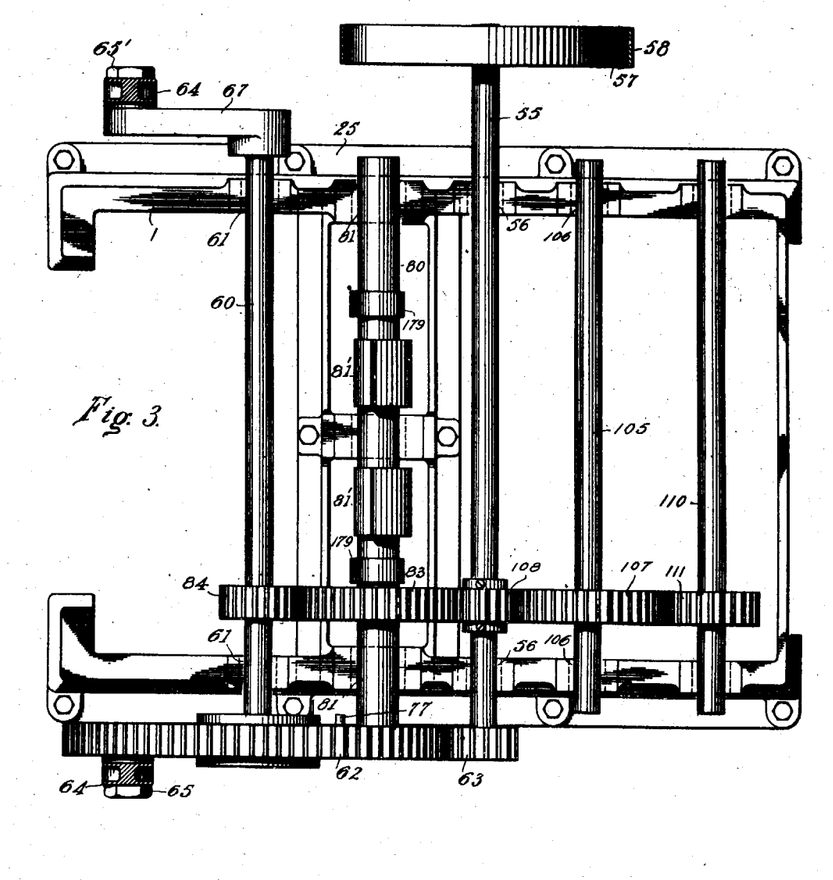
Fig. 3 a horizontal section on line 3—3 of Fig. 1.
Figure 4:
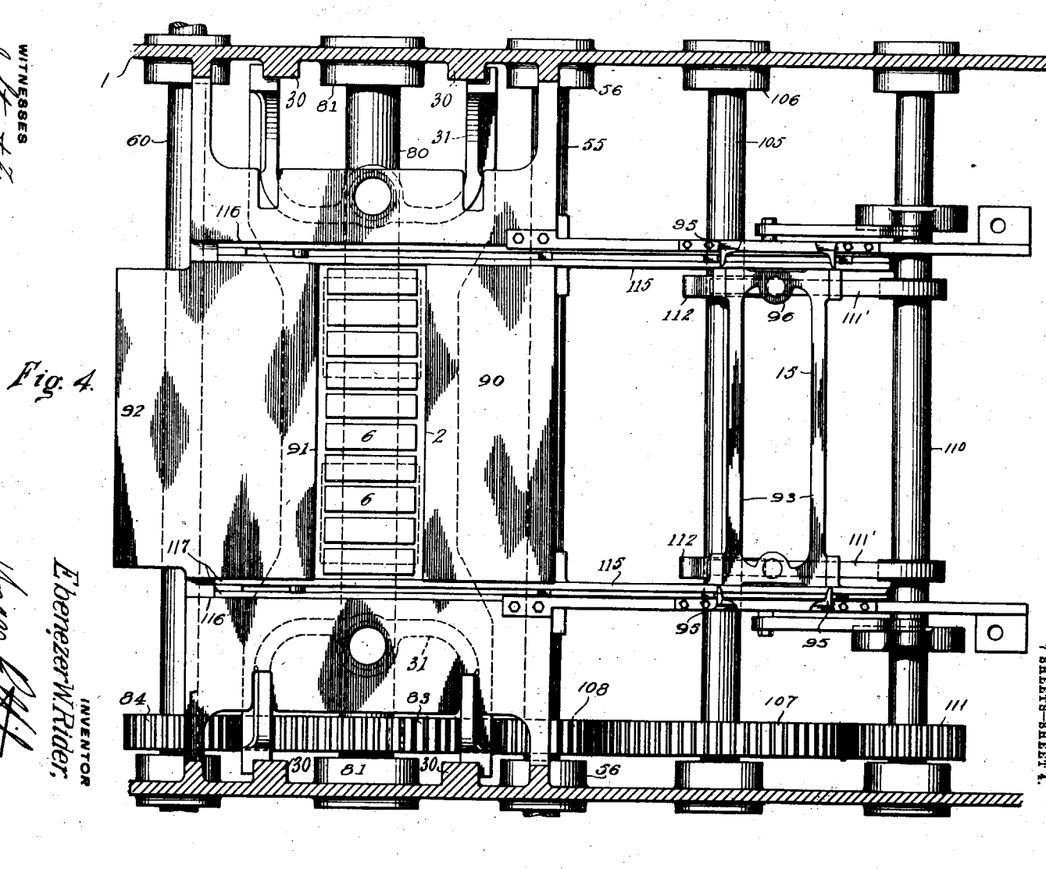
Fig. 4 a horizontal section on line 4—4 of Fig. 2.
Figure 5:
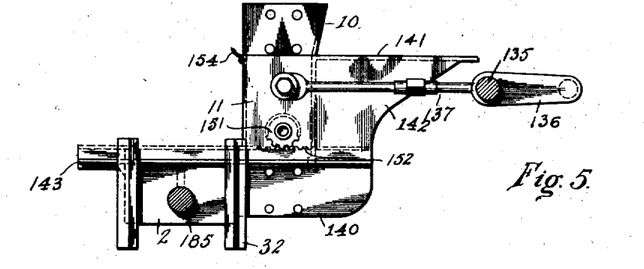
Figs. 5 and 6 are a sectional side elevation and a sectional top plan view, respectively, of a portion of the same.
Figure 6:
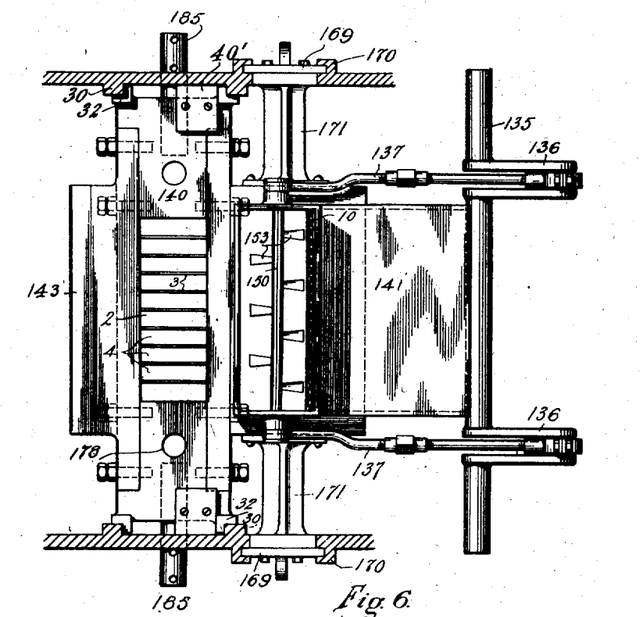
Figures 7, 8, 9, 10, 11, 12:
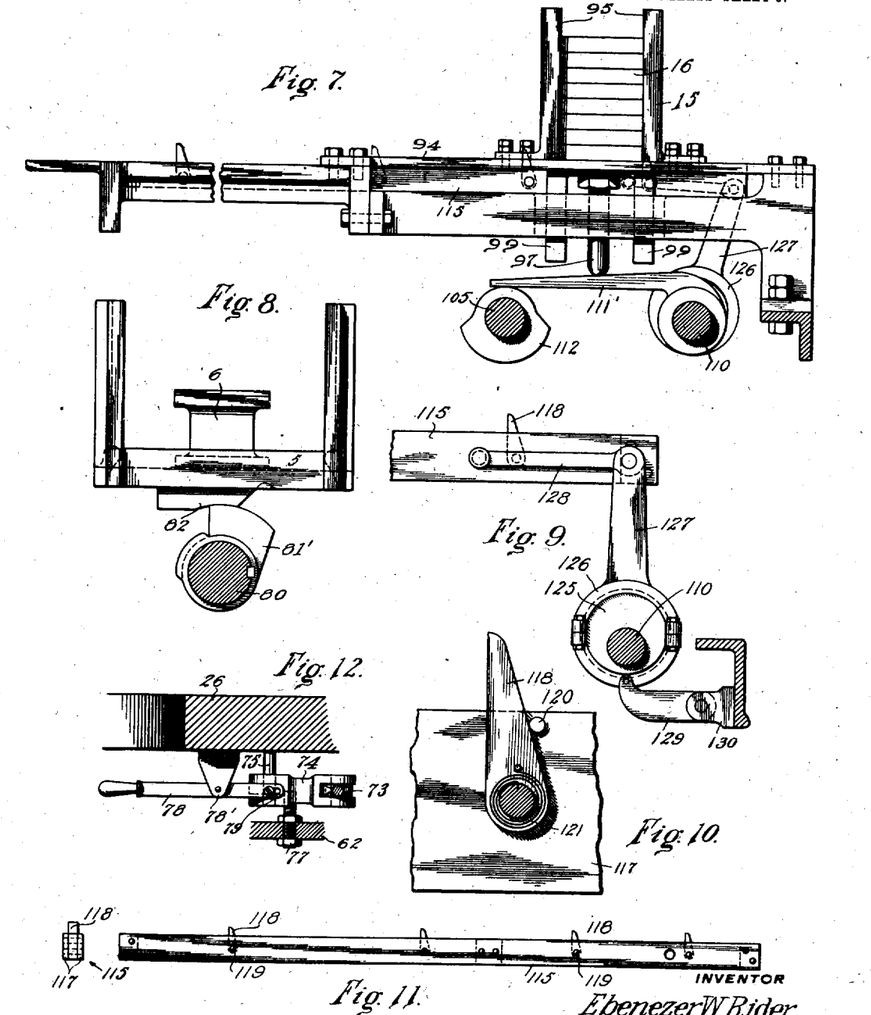
Fig. 7 is a fragmentary side elevation of a portion shown in Fig. 4.
Fig. 8 a sectional side elevation of a portion of the same.
Fig. 9 a fragmentary sectional side elevation of a portion of the same.
Fig. 10 an enlarged fragmentary side elevation of a portion shown in Fig. 9.
Fig. 11 a reduced side elevation of a detail shown in fragment in Figs. 9 and 10.
Fig. 12 a fragmentary sectional top plan view of a detail of the machine.
Figure 13:
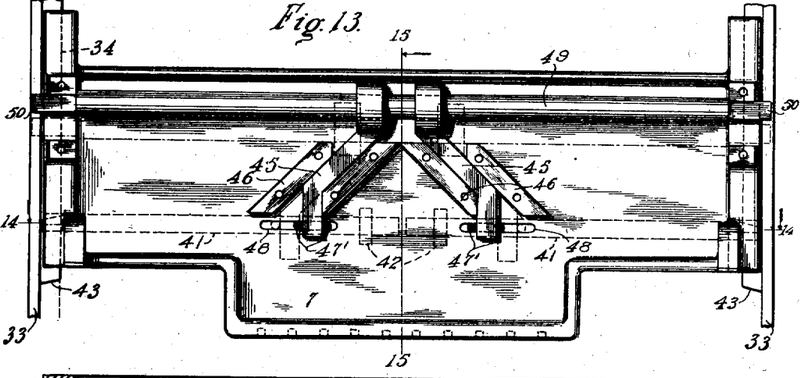
Fig. 13 a front elevation of a portion of the upper part of the machine.
Figures 14, 15, 16, 17:
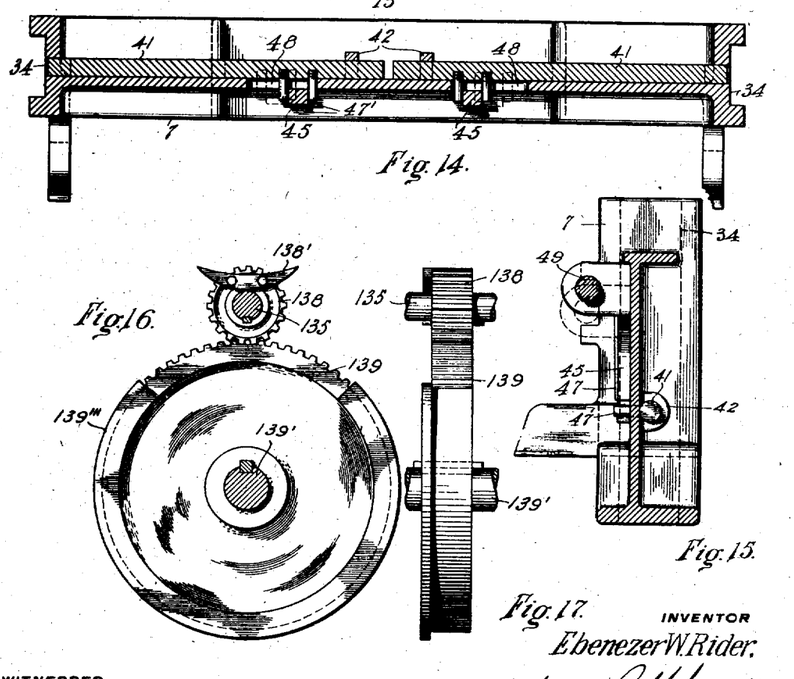
Fig. 14 a horizontal section on line 14—14 of Fig. 13.
Fig. 15 a vertical section on line 15—15 of Fig. 13.
Figs. 16 and 17 are an enlarged side elevation, and a front elevation respectively, of a detail of the machine.

In some of the views of the drawings some parts are shown; in other views are omitted for the sake of clearness.

Referring to the drawings, one embodiment of this invention may be briefly described as comprising a fixed frame 1 in which is mounted a vertically reciprocatory mold box 2, divided by vertical partitions 3 to form a plurality of rectangular molds 4, for bricks. For compressing bricks in the molds 4, a cross-head 5 is mounted to reciprocate vertically beneath the mold box 2, and is provided with a series of upwardly extending plungers 6 arranged to engage in the lower ends of the molds 4. A similar and comparatively heavy cross-head 7 is mounted to reciprocate vertically in the frame 1, above the mold box, and is provided with a series of downwardly extending plungers adapted to engage in the upper ends of the molds 4.

For feeding cement or other material into the molds 4, there is fixed, transversely upon the rear portion of the frame 1, a vertically adjustable hopper 10, beneath which is mounted to reciprocate horizontally, a feed box or feeder 11, adapted to receive the material from the hopper and to deposit the same in the molds.

For the convenient delivery of the bricks or other products from the machine, there is provided in the rear of the mold box 4, a pallet magazine 15, which is fixed on the frame 1 and is adapted to contain a plurality of pallets 16. Suitable means, hereinafter described, is provided to transfer the pallets consecutively from the pallet magazine and into position beneath the mold box 4 to receive the bricks and afterward to transfer the pallets forwardly from the mold box to be removed from the machine manually or otherwise.

All of the operations of this improved brick machine are automatic, and the machine, which has been broadly set forth above, may be described more in detail as follows: The frame 1 of this machine comprises a substantially rectangular horizontal oblong base or bed 25, and a removable superstructure, comprising a pair of oppositely disposed vertical side plates 26 rigidly secured to the opposite sides, respectively, of the bed 25, and rigidly connected thereto by bolts 27, or in any other suitable manner. These side plates are rigidly connected together at their upper ends by one or more suitable cross-braces 28. For guiding the lower cross-head 5 and the mold box 4 in their vertical reciprocations, a pair of horizontally spaced vertical parallel guides 30 are fixed upon or integral with the inner side of each side plate 26, extending upwardly from near the top plane of the bed 25 and terminating intermediate the bed and the upper end of the side plate. These guides 30, on each side plate, are arranged opposite the corresponding guides 30 on the opposite side plate and are slidably engaged by corresponding concave bearings 31 integral or rigid with the lower cross-head 5, and by corresponding concave bearings 32 integral or rigid with the mold box. For guiding the upper cross-head vertically, the upper portion of the inner side of each side plate 26 is provided with a vertical guide 33. These guides 33 are oppositely disposed and slidably engaged by corresponding concave bearings 34 integral or rigid with the upper cross-head 7.

For holding the mold-box 2 in a predetermined vertically adjustable initial fixed position, two oppositely disposed vertically arranged hook-bars 35 are provided, one on each side of the machine. The upper end of each hook-bar is pivoted to a vertically adjustable plate 36, which is provided with vertically oblong slots 37 and is clamped to the outside of the adjacent side plate of the machine by means of bolts 38 rigid with the side plate and projecting outwardly through the slots. The lower portion of each hook-bar 35 is offset inwardly, extending freely through an aperture provided therefor in the corresponding side plate, forming an upwardly and outwardly inclined shoulder 39 spaced above the lower end of the bar. The lower end of each hook-bar 35 is provided with an inwardly projecting hook 40 arranged to engage normally against the under wall of a bracket or lug 40', fixed on the mold box. The inclined shoulder 39 of each hook-bar projects normally into the path of the upper cross-head 7, and as the cross-head descends, it engages against these shoulders and oscillates the hook-bars outwardly, thus releasing the hooks 40 and permitting the mold box 2 to drop.

For locking the upper cross-head 7 against upward movement after it has been dropped, as hereinafter described, a pair of oppositely disposed bolts 41 are slidably mounted upon the rear side of the cross-head, the outer end of each bolt projecting slidably through the corresponding side wall of the cross-head and centrally of the corresponding bearing 34. The inner end of each bolt 41 is longitudinally slidable in a suitable yoke or bearing 42 rigid with the cross-head. The outer ends of these bolts 41 are adapted to engage against the lower end walls 43 of the guides 33. To compensate for slight variations in the position of the cross-head at different times after it has been dropped, and to facilitate the action of the bolts, these lower end walls 43 of the guides are preferably inclined outwardly and downwardly, and the ends of the bolts 41 are tapered accordingly.

For automatically actuating the cross-head bolts 41, a pair of oppositely disposed angular sliders 45 are arranged to reciprocate on the front of the cross-head 7. The main portion of each of these sliders 45 is preferably inclined substantially at an angle of 45° to the horizontal, and is slidably mounted between two inclined guides 46 fixed upon the cross-head. A plate 47 is preferably bolted, or otherwise secured over the guides 46 to hold the sliders 45 in position. The lower end of each slider 45 is turned vertically downward and engages slidably between two studs 47', which are fixed in one of the bolts 41 and project through an oblong horizontal slot 48 in the cross-head, the slot being of sufficient length to allow a free horizontal movement of the studs and bolt. The upper end of each slider 45 is turned vertically upwardly. A horizontal rod 49 extends snugly but slidably through the upper ends of both sliders 45, and the ends 50 of the rod project in opposite directions respectively from the cross-head. Each end of the rod 49 extends loosely through a vertical oblong slot 51 in the adjacent side plate 26 of the frame of the machine.

The ends of the rod 49 are preferably reduced in diameter and squared to form shoulders which engage slidably against corresponding fixed shoulders on the cross-head to hold the rod against longitudinal movement, but the rod is freely movable laterally in a vertical direction through a limited space with respect to the cross-head.

Power for actuating all of the automatic parts of this machine is supplied through a main driving shaft 55, which extends transversely of the machine and parallel to the front thereof, and the outer ends of which are journaled in suitable bearings 56 between the bed 25 and side plates 26 of the frame of the machine. The ends of this main driving shaft project outwardly from the side plates of the machine and one end of the driving shaft may be provided with a pulley 57 adapted to receive a belt 58 leading from any suitable counter-shaft or motor, for actuating the main driving shaft.

For lifting the upper cross-head 7, a counter-shaft 60 is arranged parallel to and spaced in front of the main driving shaft, and has its ends journaled in suitable bearings 61 between the side plates and bed of the frame of the machine. On one end of the counter-shaft 60, and outside of the frame 1, is fixed a relatively large gear 62 which meshes with a corresponding pinion 63, fixed on the adjacent end of the main driving shaft. A pitman 64 is arranged outside of the gear 62 and is rotatably mounted at one end on a crank pin 65 fixedly secured to the gear. The other end of the pitman 64 is turned inwardly and engages in the vertical slot 50 in the adjacent fixed side plate of the machine, being vertically slidable therein and being held slidably in position therein by means of plates or guides 66 bolted to the side plate. A second pitman, 64, similar to the pitman already described, is arranged upon the opposite side of the machine, and is pivoted at its lower end to a crank pin 65', carried by a crank 67 fixed on the adjacent end of the counter-shaft 60. This latter pitman engages at its upper end in the corresponding vertical slot 50 of the adjacent side plate of the machine, and performs functions similar to that of the first described pitman.

In lifting the upper cross-head, the upper end of each pitman 64 is brought into engagement against the corresponding projecting end of the rod 49 of the upper cross-head, when the upper cross-head is in its lowermost position after a stroke. The rod 49 is then first lifted with respect to the cross-head, by the pitmen withdrawing the bolts from locking engagement with the frame without moving the crosshead, and then after the rod 49 reaches the limit of its free movement with respect to the cross-head, the cross-head is lifted into its uppermost position. For holding the cross-head in its uppermost position after thus having been raised by the pitman 64, a pair of spring catches are provided, one upon each side of the front of the frame of the machine, and each comprising a horizontal pin 68 projecting slidably through a lug 69, projecting inwardly from one of the fixed side plates 26 and integral or rigid therewith. The inner end of each pin 68 normally projects inwardly into the path of the cross-head. The outer end of each pin 68 is enlarged and provided with an annular groove 68', in which engages one end of a lever 70, the other end of which is fixed upon a horizontal rock shaft 71 which is mounted to oscillate about a fixed axis in bearings 71' carried by the side plates of the machine. One end of this rock shaft has fixed thereon a lever 72, the outer end of which is pivotally connected to the upper end of a connecting rod 73, the lower end of which is pivotally connected to one end of a bell crank trip lever 74.

The bell crank trip lever 74 is mounted inside of the gear 62 to oscillate on a pivot 75 fixed on the adjacent fixed side plate of the machine, and has a free end 76 which normally depends in the path of a trip stud 77 fixed on the gear 62 and projecting inwardly therefrom. This trip lever 74 is slidable longitudinally of its pivot 75 into and out of the path of the stud 77. A hand lever 78 is pivoted on a fixed bracket 78', and one end of the hand lever is provided with an oblong slot 79 in which loosely engages a cap-screw threaded into the trip lever 74 for manually moving the trip lever longitudinally of its pivot and into and out of operative alinement with the trip stud 77.

For supporting and reciprocating the lower cross-head 5, a horizontal comparatively heavy and rigid main cam shaft 80 is arranged centrally beneath the lower cross-head and is journaled at its ends in suitable bearings 81 between the bed and side plates of the frame of the machine. Fixed upon this cam shaft, are a pair of cams 81' which engage against corresponding bearings 82, fixed on the underside of the lower cross-head 5. These cams and bearings are proportioned to give the cross-head a rigid support when necessary, and a suitable intermittent reciprocatory movement. This cam shaft 80 is actuated by means of a gear 83 fixed thereon, which engages a pinion 84 fixed on the counter-shaft 60, which is driven as heretofore described, the pitch diameter of the gear 83 being twice that of the pinion 84, so that the cam shaft revolves one revolution for every two of the counter-shaft.

For the convenient delivery of bricks, or other molded product from the machine, a main horizontal table 90 is fixed between the side plates 26 of the frame of the machine, and in a plane slightly below the lower plane of the mold box 2 when it is in its lowest position. The upper plane of this table is below the plane of the upper ends of the lower plungers 6 when these plungers are in their uppermost position. The table is provided with a rectangular oblong opening 91 through which the lower plungers reciprocate. The front of the table may be provided with a forwardly extending apron 92.

In the rear of the mold box and rigidly secured to the table 90 and to the frame of the machine, is a magazine for pallets. This magazine comprises a pair of fixed horizontal substantially parallel base plates 93, to each of which are fixed two vertical angle irons 95, the angle irons being arranged to form four vertical corners of the magazine and adapted to contain a plurality of pallets arranged in vertical series and insertible into the top of the magazine. Each of the base plates 93 is fixed at its forward end to the table 90 and at its other end to a bracket 94, spaced below the plate, and one end of which is secured to the table 90 and the other end of which is secured to the frame of the machine.

In the opening between the base plate 93 of the magazine is a vertically movable oblong rectangular horizontal lifting frame 96, which is fixed upon the upper ends of two pins 97. This lifting frame 96 is slidably mounted in fixed guides 99 depending from the magazine. For reciprocating the lifting frame 96 of the magazine vertically, a secondary cam shaft 105 is arranged in the rear of the main driving shaft 55, and is journaled in suitable bearings 106 between the bed and side plates of the machine. This cam shaft is rotated by a gear 107 fixed thereon, which engages an idler pinion 108, loosely mounted on the main driving shaft and prevented from longitudinal movement thereon by collars 109 to the shaft 55, and actuated by the gear 83 fixed on the main cam shaft 80. This gear 107 has a pitch diameter equal to that of the driving gear 83, so that the secondary cam shaft revolves at the same rate as the main cam shaft. In the rear of this secondary cam shaft 105, and parallel therewith, is a crank shaft 110, which is driven by a pinion 111 fixed thereon and meshing with, and of one half the pitch diameter of, the gear 107 fixed on the secondary cam shaft. The crank shaft 110 therefore revolves at the same rate as the counter-shaft 60 which lifts the upper cross-head. The crank shaft 110 has loosely mounted thereon, an arm 111', the free end of which engages slidably against a cam 112 fixed on the cam shaft 105. This arm engages against the lower end of the adjacent pin 97 and the cam 112 is shaped to give the pin 97 an intermittent reciprocatory movement. A similar arm 111' and cam 112, are mounted beneath the other pin 97 upon the shafts 110 and 105, respectively.

For transferring the pallets successively from the pallet magazine toward the mold box, then into position beneath the mold box to receive the bricks, and then forwardly filled with bricks and into a position upon the front of the table 90 ready for removal, a horizontal dog-bar 115 is mounted to reciprocate horizontally and longitudinally of the machine beneath each side of the magazine on the adjacent bracket 94 and in a fixed groove 116 provided therefor in the table 90, the upper edge of each dog-bar being flush with the upper surface of the table 90. Each of these dog-bars 115 consists of two plates 117, secured together in spaced relationship, and between these plates are pivoted a plurality of dogs 118 on pivots 119. In the rear of each dog and above its pivot, is fixed a stop 120 which extends through the plates and limits the rearward movement of the dog. Each dog 118 is normally held yieldingly against its stop 120 by means of a spiral spring 121 surrounding the pivot which is secured at one end to the pivot and at its other end to the dog. For reciprocating the dog-bars 115, there are fixed upon the rotary crank shaft 110 a pair of eccentrics 125, one for each dog-bar. Each of these eccentrics carries an eccentric strap 126, which has fixed thereto an eccentric arm 127 projecting radially upwardly therefrom and having pivoted at its upper free end one end of a connecting rod 128, the other end of which is pivoted to the adjacent dog-bar 115. The lower portion of the eccentric strap 126 is pivoted to one end of a rocker arm 129, the other end of which is pivoted to a lug 130 fixed upon the frame of the machine. By this construction, a rotary motion in one direction of the shaft 110 is converted into a rectilinear reciprocatory motion of the dog-bars. The arrangement of the parts in this construction, is such that when the dog-bars are in their rearmost position, the two rearmost dogs 118 on each bar will be upon opposite sides respectively of a pallet in the pallet magazine. As the pallets are raised out of the path of the dogs at every revolution of the shaft 105, as heretofore described, a pallet is in position to be engaged by the dog-bars only at every other reciprocation of the dog-bars. In this instance the dog-bars are each provided with four dogs, and the pallets are moved consecutively from the magazine, first to a point immediately in front of the magazine, then by successive reciprocations of the dog-bars to a point on the table 90 immediately in the rear of the mold box, then into position between the mold box and the lower plungers, then loaded with bricks forwardly upon the table, so that a pallet is inserted below the mold box only after alternate reciprocations of the upper plungers.

For reciprocating the feed-box 11 to supply the mold box 2 with cement or other material, a secondary crank shaft 135 is arranged horizontally in the rear of the feed-box and has its ends journaled in suitable bearings in the side plates of the frame of the machine. This crank shaft is provided with two cranks 136, one upon each side of the feed-box, and each crank is connected to the feed-box by a connecting rod 137 which is pivoted at one end to the feed-box and at its other end to the crank-pin of the crank 136.

The secondary crank-shaft 135 is driven by a pinion 138 fixed thereon, which meshes with a mutilated gear 139 fixed on an intermediate shaft 139′, which is journaled in the frame of the machine and is driven by a gear 139″, fixed thereon and meshing with the gear 107 on the intermediate cam shaft 105. The secondary crank shaft 135 is rotated once by every revolution of the mutilated gear 139, which rotates once for every revolution of the secondary cam shaft 105. A secondary slider 138′ fixed on the pinion 138 is adapted to engage a segmental flange 139‴, integral with the gear 139 to hold the pinion stationary after it has been turned through a single revolution by the teeth of the mutilated gear and until the mutilated gear has completed a revolution. The pinion is thus kept always in a position to mesh readily with the teeth of the mutilated gear.

When the feed-box 11 is in vertical alinement with the hopper 10, the box rests upon a vertical movable horizontal table 140, which is vertically adjustable by means hereinafter described. The upper rear edge of the feed-box is provided with a rearwardly extending horizontal apron 141 rigidly connected to the feed-box by means of brackets 142, and this apron acts as a closure for the lower end of the hopper 10 as the feed-box is moved forwardly out of alinement with the hopper and keeps the hopper closed except through the feed-box.

To secure a uniform distribution of material in the molds, the feed-box is arranged to reciprocate from a position in the rear of the mold box to a position in front of the mold box, and to keep the lower end of the feed-box closed while it is in front of the mold box, a forwardly extending horizontal apron 143 is fixed upon the upper front edge of the mold box flush with the upper surface of the mold box.

For guiding the feed-box 11 horizontally, the feed-box has fixed upon each side, flush with its lower edge, a flange 144, and these flanges slide between suitable parallel guides 145 fixed upon the top of the table 140 beneath the feed-box and also between similar guides 145 fixed upon the top of the mold box. The feed box is held against vertical displacement by means of plates 147 and 148 fixed upon the guides 145 and 146 respectively, and overlapping the flanges 144 of the feed-box.

The feed-box 11 may be provided with an agitator, preferably comprising a horizontal shaft 150 extending through the feed-box and having fixed on each end thereof outside of the feed-box, a gear 151 meshing with rack teeth 152, which may be cut in the guide plates 147 and 148. Fingers 153, or other means, are fixed on the shaft 150, inside of the feed-box, to agitate the material in the box.

To clear the lower ends of the upper plungers, a brush 154, or wiper, of felt or other suitable material, may be fixed upon the upper front edge of the feed-box 11, extending upwardly therefrom and arranged to engage the lower ends of the plungers as the feed-box reciprocates.

For adjusting the hopper 10 and the feed-box 11 vertically, to correspond to the initial position of the mold box 2 when resting upon the hook 40, a vertical rod 165 is fixed at its upper end to each vertically adjustable hook plate 36, and at its lower end is rigidly connected to a hopper slider 166, mounted to move freely vertically but held in fixed position horizontally between two guides 167. This slider is rigidly connected to the adjacent side of the hopper 140 by means of a vertically movable bracket 168 extending freely through a vertical oblong opening provided therefor in the adjacent side plate of the machine. Beneath this hopper slider is a similar feed table slider 169, similarly mounted between fixed guides 170 and rigidly connected by a vertically movable bracket 171 to the adjacent side of the feed-box table 140. This latter slider is rigidly connected to the former slider by a rod 172. For the convenient vertical adjustment of the hook plates 36, a pair of set screws 173 are threaded through a pair of lugs 174 arranged beneath each hook plate, the ends of the screws engaging against the lower edge of the plate. The simultaneous adjustment vertically of the mold box hooks 40, the feed-box table 140, the feed-box, and the hopper 10 may thus be accomplished simply by adjusting the two hook plates 36. The initial position of the mold box may thus be conveniently varied and the feed-box table maintained always flush with the top of the mold box, and the feed-box and hopper maintained in proper operative positions with respect to each other and to the mold box. By the vertical adjustment of these parts, it is possible to adjust the machine to any grade of material to be operated upon to secure uniformity in the dimensions of the bricks, as will appear hereinafter.

To relieve the material in the mold box from the full weight of the upper crosshead 7 after it has performed its function of compressing the material, a spiral spring 175 is arranged beneath each side of the cross-head surrounding a vertical cylindrical bar 176, the lower end of the spring resting upon a flange 177 integral with the lower end of the bar. Each bar 176 and its spring 175 extends loosely through a suitable aperture 178, provided therefor in the mold box, and the lower end of each rod is supported upon the cam 179 fixed upon the cam shaft 80. A suitable, preferably conically pointed, flanged stud 180 is fixed on the cross-head and projects downwardly therefrom in alinement with each spiral spring 175, to engage the spring and take up the impact of the cross-head. It may be mentioned in this connection, that the cams 179 controlling the vertical positions of the springs 175, are so shaped that at each revolution of the cams, the springs are held first in one fixed position vertically, and are then slightly lowered into a second fixed position, being returned to their initial positions at the beginning of each revolution of the cams for a purpose which will appear hereinafter. The springs act to relieve the bricks of the greater part of the weight of the upper cross-head and plungers after each stroke of the cross-head, to prevent the bricks from being forced out of the mold box by the mere weight of the cross-head in the first instance, and from being crushed after the mold box is removed from the bricks.

For reciprocating the mold box 2 vertically, the mold box is provided on each end with a stud shaft 185, projecting rigidly outwardly therefrom and through a vertically oblong aperture provided therefor in the adjacent side plate of the machine. Each of these stud shafts carries, rotatably mounted thereon, upon the outside of the side plate, a roller or cam follower 186, which is held in place longitudinally of the stud shaft by a split pin 187, or any other suitable means. This follower 186 is arranged to be engaged by a suitable cam 188 fixed upon the adjacent outer end of the cam shaft 80. The cams 188 are identical in construction and arrangement and are adapted to maintain the mold box stationary during a part of each revolution of the cams while a pallet is being inserted under the box, then to lower the box upon the pallet, then to lift the box quickly into its uppermost position after the second stroke of the upper plungers, to withdraw the box from the bricks and to permit the bricks to be moved on the pallet forwardly on the table, and then to permit the box to descend quickly to its initial position upon the hooks 40, which are normally held by gravity in the path of the brackets 40' carried by the box.

In the operation of this brick machine, when the parts are in their initial or starting positions, for each cycle of operations of the machine, the mold box 2 rests upon its vertically adjustable hooks 40 with its lower plane about an inch or more above the fixed table 90, and the lower plungers 6 are in their uppermost positions, projecting through the table and engaging in the lower ends of the molds 4 about an inch. The upper plungers are then maintained in their uppermost positions by the spring catches 68, the lower ends of the upper plungers being spaced slightly above the top plane of the feed-box 11, which is held stationary immediately in the rear of the mold box. It is evident that in this machine, the width of the bricks in any case depends somewhat upon the quality of the material of which the bricks are made, as there is no positive stop for the upper plungers and the plungers fall until the density of the bricks is sufficient to stop the downward movement of the plungers. To compensate for variations in the qualities of the materials of which various classes of bricks are made, the hooks supporting the mold box may be adjusted vertically, simultaneously adjusting the feed-box table, feed-box, and hopper, as hereinbefore described, so that when the mold box is in its initial position, the lower plungers will project more or less into the mold box as may be necessary in any particular case to give the finished bricks a predetermined width. While the plungers and die box are held stationary in their initial positions, the feed-box is quickly reciprocated horizontally across the upper end of the mold box and fills the mold box with cement, or other material, a constant supply of which is kept in the hopper 10, either manually or by a suitable automatic conveyer. This reciprocation of the mold box wipes the cement, or other material, forward and backward across the upper end of the mold box, thus filling the molds evenly. This movement of the mold box also cleans the lower ends of the upper plungers by means of the wiper 154 on the feed-box. As soon as the feed-box has been withdrawn out of the path of the plungers, the cross-head, carrying the upper plungers, is released by the stud 77 engaging the free end of the trip lever 74, and the cross-head is permitted to drop by gravity. During this fall, or first stroke, of the upper cross-head, and just before the plungers carried thereby engage in the molds of the mold box, which, in its initial position has been locked against downward movement, the mold box is released by the cross-head engaging against the inclined shoulders 39 on the hook bars, and in this condition the mold box acts to force the cement in the molds downwardly against the lower plungers, which are now held stationary by the cams 81, the entire weight of the mold box being sustained only by the friction of the cement in the mold. As the cement in the molds is thus forced against the lower plungers by the entire weight of the mold box, which is now free, the upper plungers, in their downward movement, engage in the upper ends of the molds, and the cement in the molds is thus compressed simultaneously in opposite directions by the two sets of plungers, although the lower plungers remain stationary during this compression.

The construction and arrangement of the machine whereby the mold box is movable vertically, or in other words, suspended in mid air, except for the friction of the material within the mold box on the sides thereof, while the plungers act simultaneously in opposite directions to compress the brick in the molds, results in a product of molded bricks which are as hard or compact on their lower edges as on their upper edges, and which are also of substantially the same density throughout. That the mold box is thus suspended in mid air except for the friction of the material in the mold box on the sides thereof during the first impact of the plungers, which act simultaneously in opposite directions, is therefore one of the most important advantages of this invention. After this first compression of the bricks, the weight of the upper cross-head is mainly supported on the spiral springs 175, which have been engaged by the studs on the cross-head during the latter part of the downward movement of the cross-head. The upper cross-head is next lifted, withdrawing the plungers carried thereby from the molds, and the cross-head is then locked in its uppermost position. The lower cross-head is then permitted to drop slightly until the upper ends of the plungers carried thereby are in a plane with the upper surface of the fixed table, and the mold box simultaneously settles until its cam followers 186 rest upon their cams 188, and maintain the mold box with its lower surface above the fixed table a sufficient distance to permit of the free insertion of a pallet between the mold box and the table. The pallet which, during the above movements, has been brought forward from the pallet magazine into a position on the fixed table immediately in the rear of the mold box by the first reciprocations of the dog-bars, is now moved into position between the mold box and the upper ends of the lower plungers, by a further reciprocation of the dog-bars, and the mold box is now lowered by its cams until it rests upon the top of the pallet. The spiral springs 175 are also lowered to be in position for the second stroke of the upper plungers. The upper cross-head is now released for its second stroke, and the bricks are moved downwardly in the molds by the impact of the upper plungers until the lower ends of the bricks impinge against the pallet resting upon the lower plungers, when the bricks are compressed between the pallet and the upper plungers, which finishes the shaping of the bricks. After this second stroke, the upper cross-head, which is now supported mainly by the spiral springs 175, is now locked in position with its plungers against the upper edges of the bricks, by the bolts 41, and the mold box is quickly lifted by its cams 188 until entirely removed from the bricks, whereupon the upper plungers are started upwardly and the pallet now supporting the free bricks is moved by the dog-bars 115 forwardly upon the table 90. This pallet, carrying the bricks, is now removed manually, or otherwise, from the machine, the mold box is permitted to fall into its initial position on the hooks 40, and the above described cycle of operation is automatically repeated.

Although only a single form has been described in which this invention may be embodied, it is obvious that the invention is not limited to the specific structure set forth, but may be applied in various forms to meet various conditions, without departing from the spirit of this invention or the scope of the appended claims.

Having thus fully described this invention, I claim and desire to protect by Letters Patent of the United States:

1. The combination with a mold, of automatically vertically reciprocatory plungers arranged to compress material in said mold, actuating means for raising said mold, means for holding said mold in its raised position, and means operating substantially with said actuating means for releasing said holding means.

2. The combination with a vertically reciprocatory plunger, of means movable with said plunger for locking said plunger against upward movement, and means actuating through said locking means for releasing and lifting said plunger.

3. The combination with a vertically reciprocatory plunger, of means movable with said plunger for locking said plunger against upward movement, means actuating through said locking means for releasing and lifting said plunger, and means for automatically locking said plunger after having been lifted.

4. The combination with a vertically reciprocatory plunger, of actuating means for lifting said plunger, means for holding said plunger in a lifted position, means controlled by said actuating means for automatically releasing said plunger to permit the same to drop by gravity, and slidably adjustable means on said plunger for automatically locking said plunger against upward movement after it has dropped.

5. The combination with a vertically reciprocatory plunger, of means movable with said plunger for automatically locking said plunger against upward movement, actuating means acting through said locking means for releasing said plunger and lifting the same, a yielding catch for holding said plunger after having been lifted, and means controlled by said actuating means for automatically releasing said catch to permit said plunger to drop by gravity.

6. The combination with a vertically reciprocatory plunger, of means movable with said plunger for automatically locking said plunger against upward movement, actuating means acting through said locking means for releasing said plunger and lifting the same, a yielding catch for holding said plunger after having been lifted, and means arranged to be controlled either by said actuating means or independently thereof for automatically releasing said catch to permit said plunger to drop by gravity.

7. The combination with a vertically reciprocatory plunger, of actuating means disconnected from and operative to raise said plunger, a catch for holding said plunger after having been raised, and means controlled simultaneously with said actuating means and independently thereof for releasing said catch to permit said plunger to drop.

8. The combination with a vertically adjustable mold, of a vertically adjustable feed-box arranged to reciprocate horizontally over said mold, and means for simultaneously adjusting said mold and said feed-box vertically, to vary the thickness of the article molded.

9. The combination with a vertically adjustable mold, of a vertically adjustable feed-box arranged to reciprocate horizontally over said mold, said mold being mounted to reciprocate vertically, independently of said feed-box, said adjustment being to vary the thickness of the article molded.

10. The combination with a vertically reciprocatory mold, of vertically adjustable means for holding said mold in a predetermined position, a vertically adjustable feed-box table arranged adjacent to said mold, a horizontally reciprocatory feed-box slidably mounted upon said table to reciprocate over said mold, a vertically adjustable hopper arranged above said feed-box and communicating therewith, and means for simultaneously adjusting all of said elements vertically, to vary the thickness of the article molded.

11. The combination with a vertically reciprocatory mold, of means to hold said mold in a predetermined position, a plunger arranged to reciprocate vertically above said mold, and means actuated by the downward movement of said plunger to release said first mentioned means to leave said mold free to move vertically in either direction.

12. The combination with a vertically reciprocatory mold, of means to hold said mold in a predetermined position, vertically reciprocatory means arranged beneath said mold to compress material therein, and a plunger arranged to reciprocate vertically above said mold, the downward movement of said plunger acting to release said first mentioned means, whereby material is compressed in said mold while said mold is free to move vertically in either direction.

13. The combination with a mold, of a plunger arranged to reciprocate vertically above said mold, actuating means to raise said plunger, a catch to hold said plunger raised, means controlled by said actuating means for releasing said catch, and yielding means to sustain the weight of said plunger after it has performed its function of compressing material in said mold.

14. The combination with a mold, of a plunger arranged to reciprocate vertically above said mold, actuating means to raise said plunger, a catch to hold said plunger raised, means controlled by said actuating means for releasing said catch, yielding means to sustain the weight of said plunger after it has performed its function of compressing material in said mold, and means controlled by said actuating means for varying the position of said yielding means.

15. The combination with a vertically reciprocatory mold, of a vertically reciprocatory plunger arranged above said mold to coöperate therewith, actuating means for raising said plunger, a catch for holding said plunger raised, means controlled by said actuating means for releasing said catch, to permit said plunger to fall, yielding means for sustaining the weight of said plunger after it has performed its function of compressing material in said mold, a cam shaft operatively connected to said actuating means for raising and lowering said mold, and means actuated by said cam shaft for varying the position of said yielding means during successive reciprocations of said plunger.

16. The combination with a horizontally stationary mold, of means to compress material in said mold, means operative to move separate pallets into alinement with said mold after said material has been partially compressed, and means operative to complete the compression of said material on said pallet.

17. The combination with a vertically reciprocatory and horizontally stationary mold, of means to compress material in said mold, horizontally reciprocatory means for moving separate pallets into alinement with said mold after said material has been partially compressed, and means operative to further compress said material on said pallet.

18. The combination with a vertically reciprocatory mold, of means for compressing material in said mold, actuating means for raising said mold, and for holding said mold in a predetermined position vertically, and horizontally reciprocatory means for moving a pallet into alinement with said mold after alternate downward strokes of said compressing means, said holding means being automatically released to permit said mold to fall upon said pallet after said pallet has been moved into alinement therewith.

19. The combination with a vertically reciprocatory mold, of a plunger arranged to reciprocate vertically above said mold to compress material therein, means to hold said mold in a predetermined position vertically, and means to move a pallet into alinement beneath said mold after alternate downward strokes of said compressing means, and afterward to lower said mold into position upon said pallet.

20. The combination with a mold, of a magazine for holding a plurality of pallets, reciprocatory means for conveying said pallets consecutively from said magazine toward said mold, and means to move the pallets in said magazine out of the path of said reciprocatory means during the alternate reciprocation thereof.

21. The combination with a mold, of a pallet magazine, and means for conveying pallets from said magazine toward said mold, said means comprising a pair of oppositely disposed horizontally reciprocatory dog-bars, dogs yieldingly connected to said dog-bars, and vertically reciprocatory means for raising the pallets in said magazine out of the path of said dogs during alternate reciprocations of said dog-bars.

22. The combination with a mold, of a pallet magazine spaced from said mold, and reciprocatory means for conveying pallets from said magazine toward said mold and outwardly therefrom, said means acting at every other reciprocation to take a pallet from said magazine and move it into position between said magazine and said mold, then on the next reciprocation of said means to bring said pallet into position adjacent said mold, and then on the next reciprocation to bring said pallet into alinement beneath said mold, and then on the next reciprocation to remove said pallet outwardly from said mold.

23. The combination with a horizontal table, of a vertically reciprocatory mold above said table, a vertically adjustable means normally stationary vertically, and operative to intermittently engage said mold, said means being operative to temporarily support said mold in spaced relation to said table.

24. The combination with a horizontal table, of a vertically reciprocatory mold above said table, and a pair of vertically adjustable hook-bars, in normally stationary relation and intermittently engaging said mold, to temporarily support said mold in spaced relation to said table.

25. The combination with a horizontal table, of a vertically reciprocatory mold above said table, a vertically reciprocatory plunger extending upwardly through said table and engaging in its initial position in said mold, a vertically reciprocatory plunger arranged above said mold to coöperate with said first mentioned plunger in compressing material in said mold, and automatic means for withdrawing said first mentioned plunger from said mold and for then inserting a pallet between said mold and said first mentioned plunger between alternate strokes of said last mentioned plunger.

26. The combination with a movable mold, of means for the compression of material in said mold, said mold being freely movable during said compression, except by the friction of the material therein against the sides thereof.

27. The combination with a movable mold, of oppositely acting means for the compression of material within said mold, said mold being supported during said compression by the friction of said material solely.

28. The combination with a vertically movable mold, of automatic means for the compression of material in said mold, said mold being unsupported vertically during said compression, except by the friction of said material thereon.

29. The combination with a vertically movable mold, of automatic means for the compression of material in said mold, means for holding said mold in a predetermined initial position, and means for automatically releasing said holding means just prior to the compression of material in said mold, said mold being movable vertically in either direction during said compression.

30. The combination with a mold, of automatic means for the compression of material in said mold, said mold being suspended in mid air during said compression, and supported only by the friction of said material therein.

31. The combination with a horizontal table, of a vertically reciprocatory mold above said table, a vertically reciprocatory plunger extending upwardly through said table and engaging in its initial position in said mold, a vertically reciprocatory plunger arranged above said mold to coöperate with said first mentioned plunger in compressing material in said mold, said mold during this compression being supported solely by the frictional engagement of the material therein, and automatic means for withdrawing both of said plungers from said mold, for then inserting a pallet between said mold and said first mentioned plunger, and for then lowering said mold upon said pallet.

32. The combination with a horizontal table, of a vertically reciprocatory mold above said table, a vertically reciprocatory plunger extending upwardly through said table and engaging in its initial position in said mold, a vertically reciprocatory plunger arranged above said mold to coöperate with said first mentioned plunger in compressing material in said mold, said mold during this compression being supported solely by the frictional engagement of the material therein, and automatic means for withdrawing said first mentioned plunger from said mold, for then inserting a pallet between said mold and said first mentioned plunger, for then lowering said mold upon said pallet, and for then releasing said upper plunger to compress material in said mold against said pallet.

33. The combination with a horizontal table, of a vertically reciprocatory mold above said table, a vertically reciprocatory plunger extending upwardly through said table and engaging in its initial position in said mold, a vertically reciprocatory upper plunger arranged above said mold to coöperate with said first mentioned plunger in compressing material in said mold, said mold during this compression being supported solely by the frictional engagement of the material therein, and automatic means for lifting said upper plunger and releasing the same to engage in said mold, for then withdrawing both of said plungers from said mold, for then inserting a pallet between said mold and said first mentioned plunger, for then lowering said mold upon said pallet for raising and releasing said upper plunger a second time to compress material in said mold against said pallet, and for then holding said upper plunger stationary and lifting said mold from the material contained therein and then moving said material on said pallet away from said mold.

In witness whereof, I have hereunto set my hand this fifth day of January A. D. 1911.

EBENEZER W. RIDER.

Witnesses:
ADDISON IRWIN GARDNER,
ALEXANDER PARK.

---

It is hereby certified that in Letters Patent No. 1,051,010, granted January 21, 1913, upon the application of Ebenezer W. Rider, of Detroit, Michigan, for an improvement in "Molding-Machines," errors appear in the printed specification requiring correction as follows: Page 9, line 82, for the words "freely movable" read *unsupported;* same page, line 109, strike out the words "in mid air"; and that the said Letters Patent should be read with these corrections therein that the same may conform to the record of the case in the Patent Office.

Signed and sealed this 25th day of February, A. D., 1913.

[SEAL.]

C. C. BILLINGS,

*Acting Commissioner of Patents.* extending upwardly through said table and engaging in its initial position in said mold, a vertically reciprocatory plunger arranged above said mold to coöperate with said first mentioned plunger in compressing material in said mold, said mold during this compression being supported solely by the frictional engagement of the material therein, and automatic means for withdrawing said first mentioned plunger from said mold, for then inserting a pallet between said mold and said first mentioned plunger, for then lowering said mold upon said pallet, and for then releasing said upper plunger to compress material in said mold against said pallet.

33. The combination with a horizontal table, of a vertically reciprocatory mold above said table, a vertically reciprocatory plunger extending upwardly through said table and engaging in its initial position in said mold, a vertically reciprocatory upper plunger arranged above said mold to coöperate with said first mentioned plunger in compressing material in said mold, said mold during this compression being supported solely by the frictional engagement of the material therein, and automatic means for lifting said upper plunger and releasing the same to engage in said mold, for then withdrawing both of said plungers from said mold, for then inserting a pallet between said mold and said first mentioned plunger, for then lowering said mold upon said pallet for raising and releasing said upper plunger a second time to compress material in said mold against said pallet, and for then holding said upper plunger stationary and lifting said mold from the material contained therein and then moving said material on said pallet away from said mold.

In witness whereof, I have hereunto set my hand this fifth day of January A. D. 1911.

EBENEZER W. RIDER.

Witnesses:
ADDISON IRWIN GARDNER,
ALEXANDER PARK.

---

It is hereby certified that in Letters Patent No. 1,051,010, granted January 21, 1913, upon the application of Ebenezer W. Rider, of Detroit, Michigan, for an improvement in "Molding-Machines," errors appear in the printed specification requiring correction as follows: Page 9, line 82, for the words "freely movable" read *unsupported;* same page, line 109, strike out the words "in mid air"; and that the said Letters Patent should be read with these corrections therein that the same may conform to the record of the case in the Patent Office.

Signed and sealed this 25th day of February, A. D., 1913.

[SEAL.]

C. C. BILLINGS,

*Acting Commissioner of Patents.*

It is hereby certified that in Letters Patent No. 1,051,010, granted January 21, 1913, upon the application of Ebenezer W. Rider, of Detroit, Michigan, for an improvement in "Molding-Machines," errors appear in the printed specification requiring correction as follows: Page 9, line 82, for the words "freely movable" read *unsupported;* same page, line 109, strike out the words "in mid air"; and that the said Letters Patent should be read with these corrections therein that the same may conform to the record of the case in the Patent Office.

Signed and sealed this 25th day of February, A. D., 1913.

[SEAL.]

C. C. BILLINGS,

*Acting Commissioner of Patents.*